United States Patent [19]

Sappok

[11] Patent Number: 4,708,571

[45] Date of Patent: Nov. 24, 1987

[54] METHOD OF AND APPARATUS FOR THE INTRODUCTION OF RADIOACTIVE METALLIC WASTES INTO A MELTING FURNACE

[75] Inventor: Manfred Sappok, Tönisvorst, Fed. Rep. of Germany

[73] Assignee: Siempelkamp Giesserei GmbH & Co., Krefeld, Fed. Rep. of Germany

[21] Appl. No.: 812,391

[22] Filed: Dec. 23, 1985

[51] Int. Cl.[4] .......................... G21C 19/00; B65G 65/00

[52] U.S. Cl. .......................... 414/412; 414/146; 414/199; 414/419; 414/786; 376/260; 376/203

[58] Field of Search ............... 376/260, 261, 341, 342, 376/340, 310, 308, 272, 269, 203; 414/411, 412, 419, 421, 786, 172, 188, 199, 146; 252/632, 626, 633, 628, 629; 220/345

[56] References Cited

U.S. PATENT DOCUMENTS

| | | | |
|---|---|---|---|
| 3,711,993 | 1/1973 | Liesch et al. | 376/260 |
| 3,765,549 | 10/1973 | Jones | 414/146 |
| 3,940,577 | 2/1976 | Christofer | 414/146 |
| 4,095,707 | 6/1978 | Kowtko | 414/421 |
| 4,228,864 | 10/1980 | Berger et al. | 414/411 |
| 4,281,691 | 8/1981 | Goutard et al. | 414/146 |
| 4,308,899 | 1/1982 | Misik | 414/199 |
| 4,310,034 | 1/1982 | Guilloteau et al. | 376/260 |
| 4,432,942 | 2/1984 | Adachi et al. | 252/626 |
| 4,561,822 | 12/1985 | Schmook | 414/421 |
| 4,564,327 | 1/1986 | Lünig | 414/199 |
| 4,569,623 | 2/1986 | Goldmann | 414/421 |
| 4,576,779 | 3/1986 | McWilliam et al. | 220/345 |

FOREIGN PATENT DOCUMENTS

| | | | |
|---|---|---|---|
| 0748526 | 6/1970 | Belgium | 376/272 |
| 2554257 | 6/1977 | Fed. Rep. of Germany . | |
| 3002695 | 8/1980 | Fed. Rep. of Germany . | |

*Primary Examiner*—Deborah L. Kyle

*Assistant Examiner*—Daniel Wasil

*Attorney, Agent, or Firm*—Karl F. Ross; Herbert Dubno

[57] ABSTRACT

A method of and apparatus for melting radioactive waste contained in a metal transport vessel and in which the transport vessel is introduced into a container which is closed by a laterally retractable cover and then inverted by rotation through 180° about a horizontal axis to lie above the mouth of a furnace. The mouth of the furnace is provided with a horizontally retractable slider and the cover and the slider are independently retracted to allow discharge of the transport vessel and the radioactive waste contents thereof into the furnace for melting therein. The container and its cover thus form part of the gate allowing transfer of the radioactive waste into the furnace without a hot or radioactive cell shielding the entire unit from vagabond or wayward radioactivity.

10 Claims, 6 Drawing Figures

METHOD OF AND APPARATUS FOR THE INTRODUCTION OF RADIOACTIVE METALLIC WASTES INTO A MELTING FURNACE

FIELD OF THE INVENTION

My present invention relates to a method of and to an apparatus for the introduction of metallic wastes into a melting furnace, to a method of operating a furnace for the melting of radioactive metallic wastes received in a transport vessel, and to an apparatus for melting radioactive metallic wastes as may be contained in a transport vessel having a cover.

BACKGROUND OF THE INVENTION

It is known to store or package metallic wastes from radioactive installations such as nuclear power plants and other installations having nuclear reactors in metallic transport vessels with transport vessel covers, the radioactive waste being sealed in such vessels at least for transport purposes.

It is also known to melt such radioactive wastes to reduce the overall volume and to form a solidified mass from the melt which can be cast as an ingot or like structure in a suitable receptacle for terminal storage. In this form, radioactive materials tend to leak or otherwise pass significantly more slowly from the solidified mass.

In this connection reference may be had to German Patent Document - Open Application DE-OS No. 25 54 257 in which a transport vessel of this type for receiving radioactive wastes can be filled at a nuclear power plant and melted at a location distal to that plant.

A melting furnace is described in German Patent Document -Open Application DE-OS No. 30 02 695 which is formed with a gate so that the transport vessel can be emptied into the gate and the radioactive waste then discharged into the furnace upon the opening of the slider of this gate. It has been found that this system has the disadvantage that radioactive particles and what may be referred to as vagabond radioactivity can be liberated during such furnace filling processes. As a consequence, the furnace and the filling equipment therefore can or must form a radioactive cell which is constantly at a high level of radioactivity so that it must be especially constructed to prevent the escape of vagabond radioactivity to the environment. This is, of course, expensive and such systems are difficult to operate without at least some leakage of radioactivity.

OBJECTS OF THE INVENTION

It is the principal object of the present invention to provide a method of introducing radioactive wastes into a melting furnace whereby these disadvantages are obviated.

Another object of the invention is to provide an apparatus for carrying out the improved method.

It is also an object of my invention to provide an improved method of operating a furnace for the melting of radioactive metallic wastes whereby the drawbacks of earlier systems are obviated and, in particular, wayward radioactivity no longer can develop even without the use of expensive equipment to prevent against it.

Yet another object of the invention is to provide a method of and an apparatus for the melting of radioactive wastes which can be utilized without special precautions but with, of course, appropriate shielding, in any conventional foundry application without having to provide a special radioactive cell for the purpose.

SUMMARY OF THE INVENTION

These objects and others which will become apparent hereinafter are attained, in accordance with the present invention in which a transport vessel for the metallic radioactive wastes and which preferably is metallic itself so that it can be melted along with the waste, is inserted from above in a furnace charging container which is upwardly open and has a mouth adapted to be closed by a laterally retractable container cover. The container is then inverted about a horizontal axis to form the gate which is placed upon the mouth of the melting oven upon a seating ring which can be provided with a gate slider of this mouth and adapted to close the mouth of the oven or furnace.

Upon the rotation of the container through 180° about a horizontal axis to invert it, the container cover can be laterally retracted and the gate slider of the mouth of the furnace likewise horizontally withdrawn to permit the transport container with the radioactive waste to pass directly into the furnace. The furnace is then placed in operation and the contents thereof can be inductively melted under vacuum. The transport vessel generally consists of a thin wall cast vessel which is readily smelted in the smelting furnace. When the transport vessel is introduced into charging container, therefore, depending upon the nature of the radioactive waste, there generally is no danger that vagabond radioactivity will be emitted if the transport vessel has had its cover previously removed. However, while in one embodiment of the invention the cover of the transport vessel is removed, in another embodiment of the invention, the transport vessel has its cover merely loosened before the cover of the container is closed. In the latter case, the cover falls with the transport vessel into the furnace and is melted with the waste and the transport vessel therein.

It is also possible in accordance with another embodiment of the invention to leave the transport vessel cover sealingly attached to the transport vessel, i.e. to do away with the step of loosening the vessel cover, in which case the invention provides for the perforation of the bottom of the transport vessel once it has been sealed in the container and the container has been inverted. The piercing of the bottom of the transport vessel can be effected by a fluid operated perforation punch adapted to form at least one hole sufficient to permit venting of gases from the transport vessel during the melting step so that a detrimental explosion or bursting of this vessel does not occur. The vent hole thus provided allows depressurization of the interior of the transport vessel within the melting furnace itself and so that there will be no dispersal of radiation to the environment through the vent hole.

The advantages of the invention should be immediately apparent in that vagabond radioactivity no longer can escape into the environment utilizing the method and apparatus of the invention. There is no need to provide special hot cells or special constructions for the apparatus other than the normal radioactive shielding which one provides around the melting furnace to prevent escape of radiation through the walls thereof.

Utilizing conventional techniques, a siphon arrangement in the form of a U-shaped tube can be used to transfer the melt to a receptacle in the form of an ingot mold and which simply provides the form for the ingot to be cast or is adapted to continue to receive the ingot after it has solidified as a final container for the radioactive waste. The ingot receiving receptacle has one leg of the U-shaped tube extending into it and is sealed, suction being applied thereto to draw the melt upwardly through the other leg of the U-shaped tube, this latter leg being introduced into the melt.

Advantageously in the apparatus aspects of the invention, a furnace charging carriage is provided which is formed with means laterally supporting the container to enable it to be swung through 180° from an upright position in which the container receives the transport vessel with or without the cover in the manner described, and enables the container to be inverted about the horizontal axis into a position in which the mouth of the container is turned downwardly. A guide can be provided whereby the outriggers which pivotally support the container can move along the charging carriage from the position in which the container receives the transport vessel into a position in which the mouth of the container can rest upon the seating ring at the furnace mouth.

Advantageously, the means for retracting the container cover and the means for retracting the slider gate at the mouth of the furnace are angularly offset through 90°, the cover and the slider moving at right angles to one another to open the passage from the container into the furnace.

Advantageously, the container bottom opposite its mouth is formed with a perforating device for perforating the bottom of the transport vessel in the manner described.

BRIEF DESCRIPTION OF THE DRAWINGS

The above and other objects, features and advantages of the present invention will become more readily apparent from the following description, reference being made to the accompanying drawings in which.

SPECIFIC DESCRIPTION

Figure 1A:
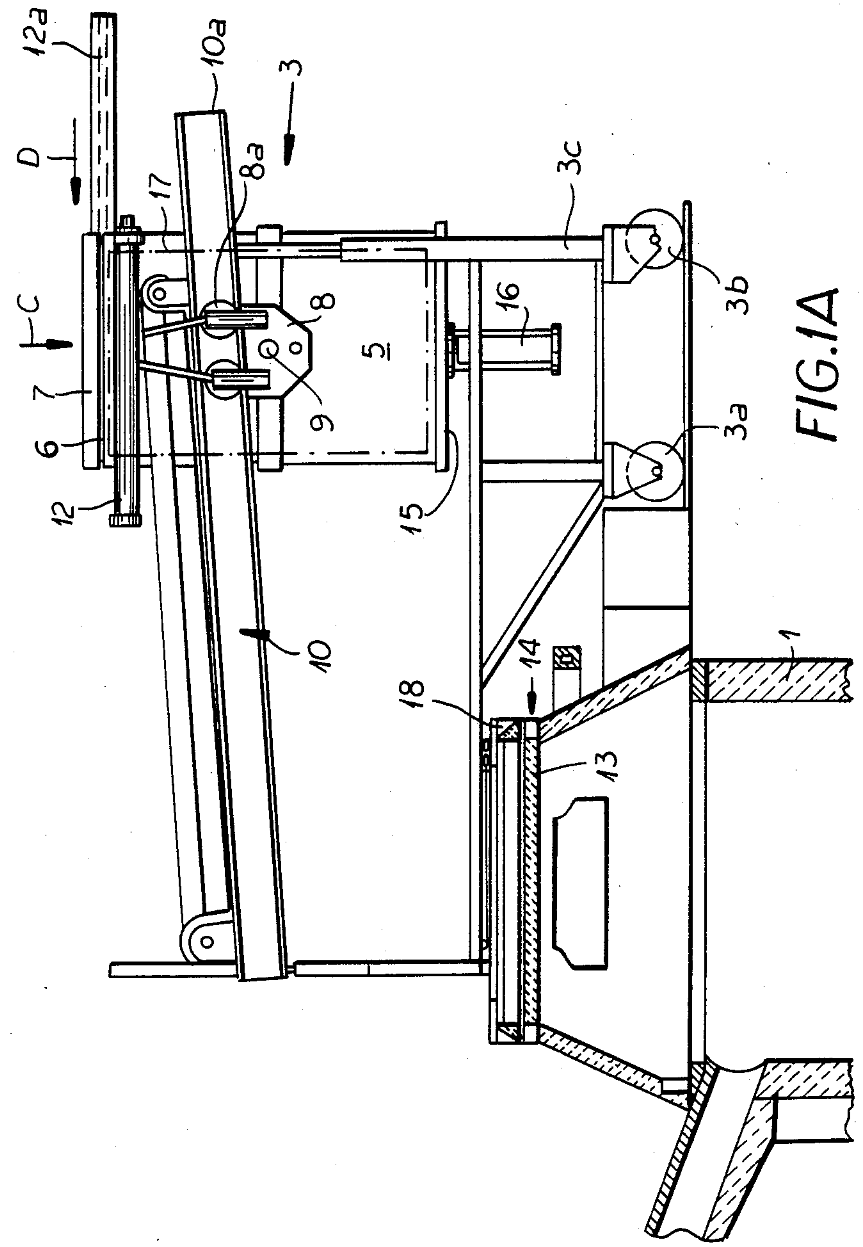
FIG. 1A is a highly diagrammatic side elevational view, showing the furnace in cross section, of a charging unit for a melting furnace in accordance with the present invention and showing the container thereof in the position in which it is adapted to receive the transport vessel which has been shown in dot dash lines in this FIGURE.

In general, the apparatus shown in the drawing comprises a melting furnace 1 which may be of any conventional type and can be inductively heated and evacuated. For convenience, the evacuation is shown to be effected by a fitting 4 communicating with a hood 1a at the top of the furnace. The balance of the furnace has not been illustrated but it will be understood that this furnace can have a siphon transfer device including an inverted U tube of the type previously mentioned, one leg of which reaches into the melt within the furnace while the other leg of which reaches into a sealed ingot mold or receptacle which in turn is evacuated.

At the mouth of the furnace defined by the hood 1a, a gate generally represented at 2 is provided. As can be seen from a comparison of FIGS. 1A and 1B this gate is formed by a container 5 which can be positioned over the mouth of the furnace in the alignment with and engagement with a seating ring 18, the mouth otherwise being closed by a slider represented at 13 which will be described in greater detail hereinafter.

Figure 1B:
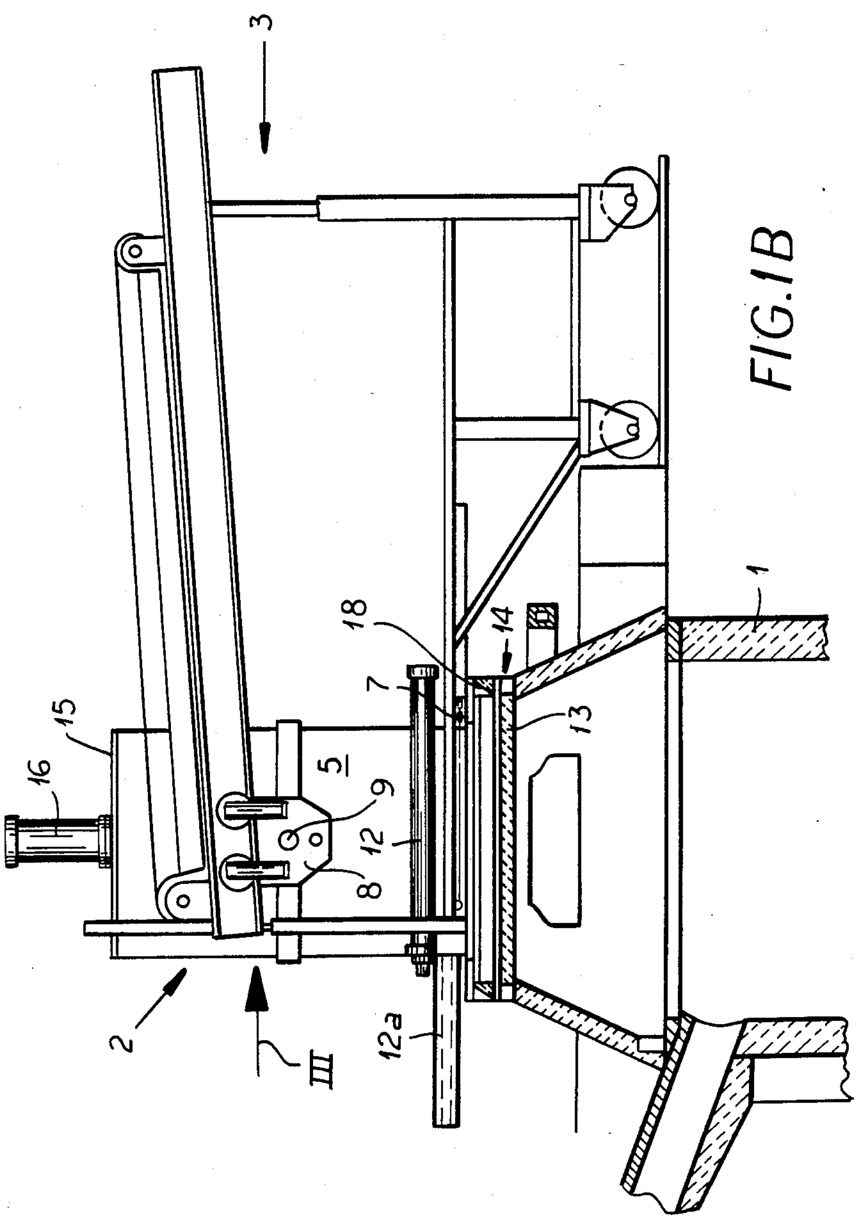
FIG. 1B shows the charging apparatus of FIG. 1A but with the container inverted and displaced so that it rests upon the seating ring of the furnace.

The device 3 for transferring the waste to the furnace 1 generally comprises a carriage mounted upon wheels 3a, 3b and having a framework 3c which carries a guide 10a forming part of a transfer unit generally represented at 10 laterally engaging the container 5 and enabling the container to be shifted from the position shown in FIG. 1A in which it receives the vessel to a position in which the container is inverted and discharges its contents, namely the vessel and the radioactive waste, into the furnace (FIG. 1B).

The furnace charging container 5 has an upper container mouth in its initial position shown in FIG. 1A which can be closed by a laterally retractable cover 7 guided on a track 12a and displaced by a fluid operated cylinder arrangement 12 affixed to the container is suspended by a pair of laterally extending trunions 9 and a yoke 10b carrying the trunions in a pair of pivot carriages 8 which are guided by rollers 8a on the track 10a previously mentioned. The assembly 10a, 10b forms a guide unit 10 enabling the container to be shifted between its right hand position shown in FIG. 1A and its left hand position shown in FIG. 1B along the track 10a. The trunnions 9 define a horizontal pivot axis about which the container may be swung through 180°.

The charging carriage 3 can be therefore filled with the transport vessel represented in dot dash lines in FIG. 1A and 17 at any location and then brought into the region of the furnace with the container 5 inverted or the container 5 can be inverted and then the container moved toward the transport vessel with the carriage 3 in place.

Figure 2:
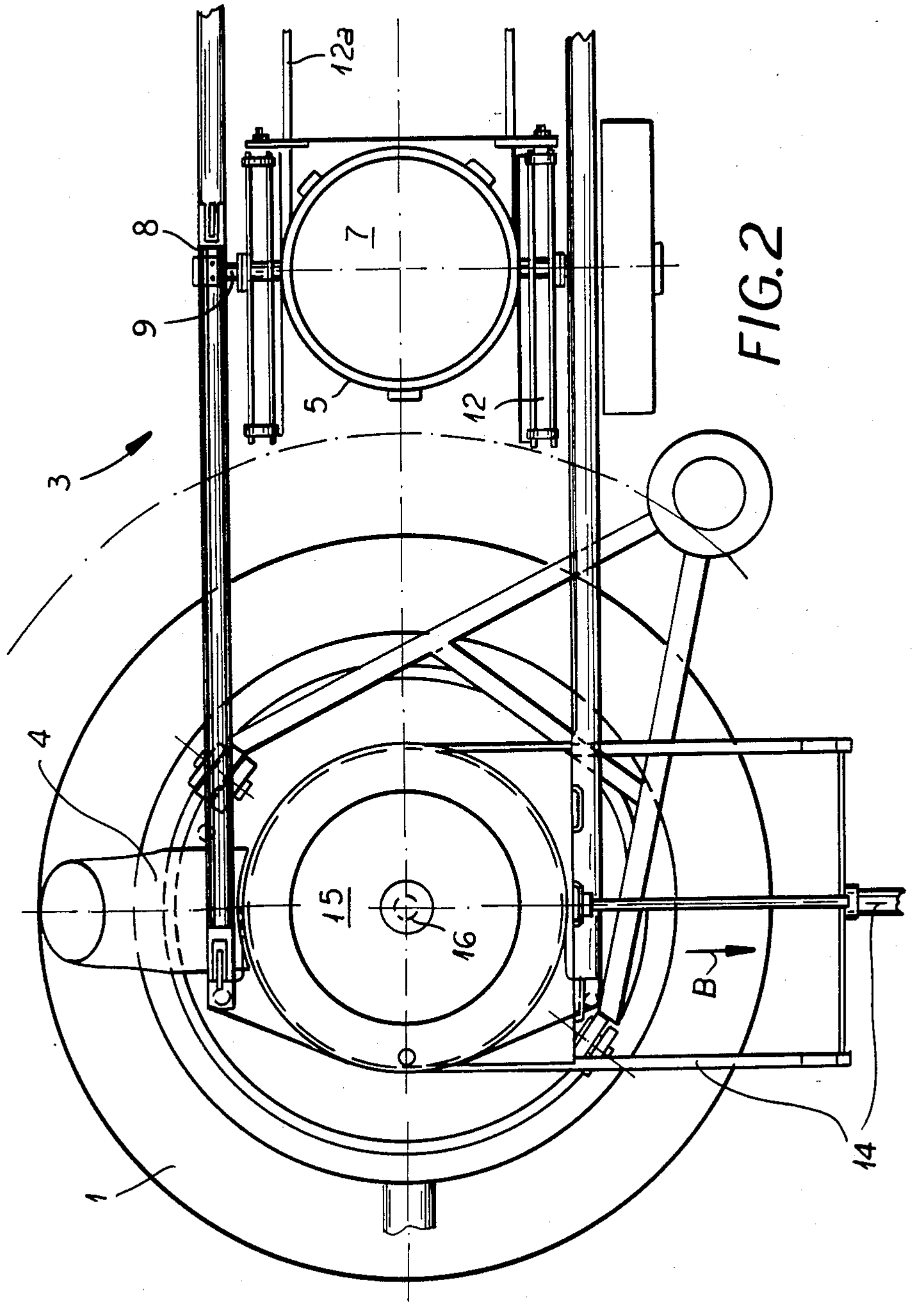
FIG. 2 is a plan view of the apparatus of FIGS. 1A and 1B, also in highly diagrammatic form.
Figure 3:
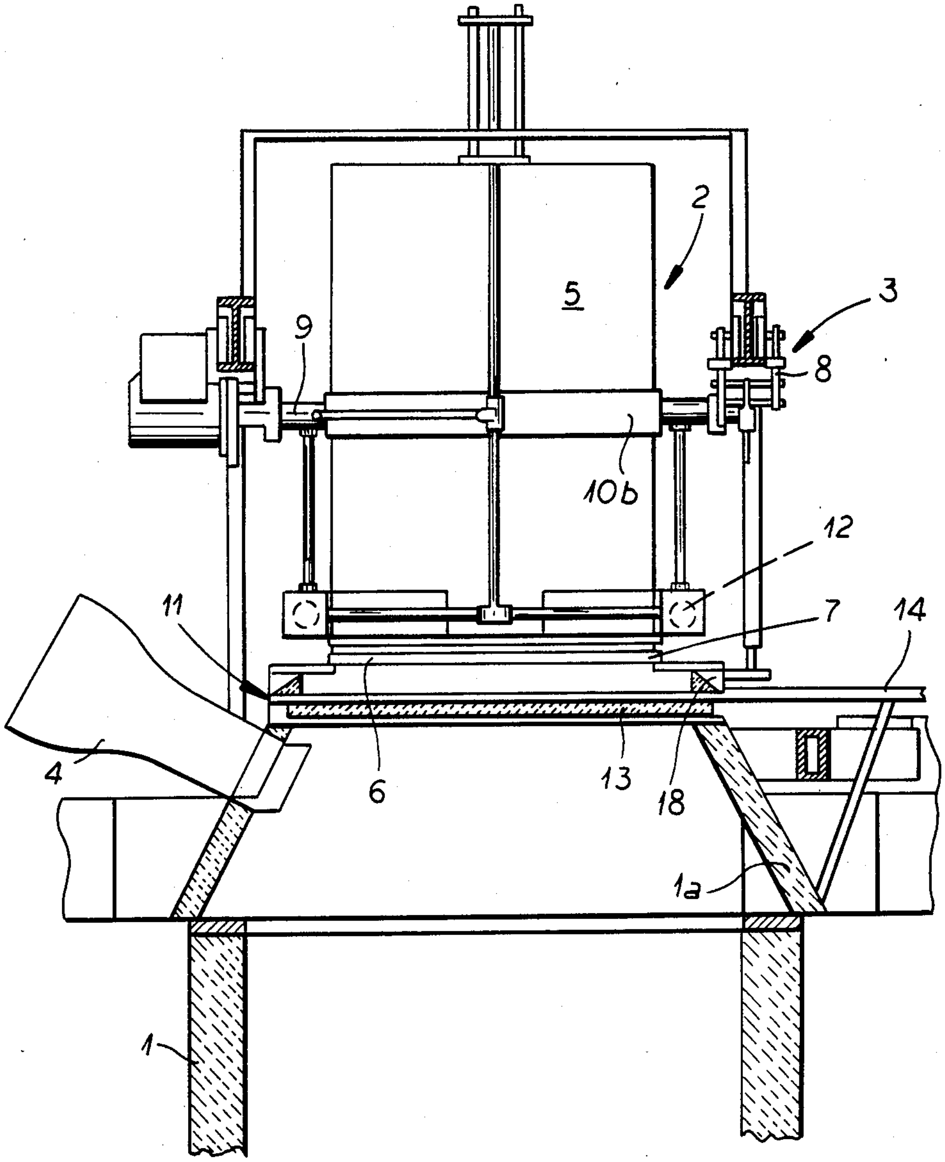
FIG. 3 is a highly diagrammatic elevational view of the apparatus seen in the direction of the arrow III in FIG. 1B.

As previously mentioned, the mouth of the furnace is provided with a gate slider arrangement generally represented at 11 onto which the inverted mouth of the container 5 can be placed, the slider gate 13 of this mouth being displaceable independently of the retractable cover 7 by a slider retraction unit 14 which may also be a fluid operated unit. As can be seen from FIG. 2, the unit 14 lies at a right angle to the unit 12 which displaces the cover 7.

Figure 4:
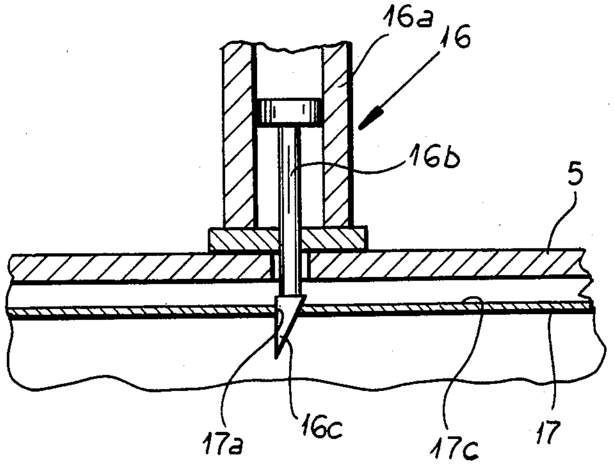
FIG. 4 is a cross section through the perforating device illustrated in the previous FIGURES showing the penetration of the vessel bottom.

In addition, the bottom 15 of the container 5 can be formed with a perforating unit 16 which has been illustrated in greater detail in FIG. 4. The unit 16 can comprise a fluid pressurizable cylinder 16a which has a piston 16b connected to a piercing tool 16c adapted to pierce the bottom 17c of the transport vessel 17 to leave a hole 17a therein of a diameter or cross section sufficient to vent the pressure build up in the container if the cover 17b is left sealingly attached thereto when that cover is introduced with that vessel into the container 5.

Figure 5:
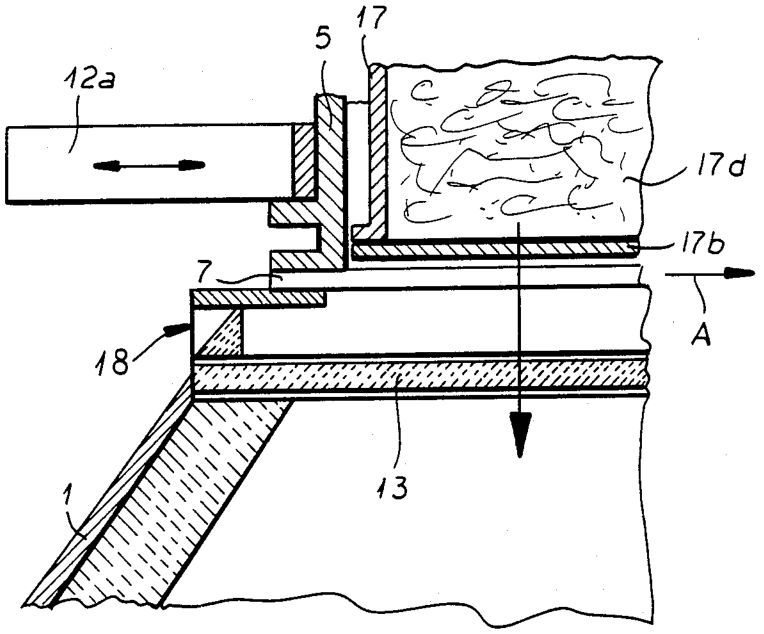
FIG. 5 is a detail view of the relationship of the retractable cover of the container and the slider of the seating ring at the mouth of the furthest.

As has been shown in greater detail in FIG. 5, when the container 5 is positioned on the seating ring 18 of the mouth of the furnace, the slider 13 and the cover 7 are normally in their closed position. In this embodiment, the cover 17b has been shown to have been loosened somewhat from the transport vessel 17. The waste is illustrated at 17*d* in this FIGURE. The cover 7 is then retracted in the direction of arrow A while the slider 13 is retracted in the direction of arrow B (FIG. 2) and the cover 17*b*, the waste 17*d* and even the container 17 can fall freely into the furnace 1.

FIGS. 1A and 1B show two functional positions of the apparatus. FIG. 1A shows the charging container 5 in its position in which the transport vessel 17 can be inserted. After insertion of the transport vessel 17, the cover can be loosened or can be permitted to remain in place or even removed as previously mentioned. The transport vessel 17 is lowered into the container 5 by any conventional hoist provided in the foundry.

The container is inserted in the direction of the arrow C shown in FIG. 1A.

The cover 7 is thereupon closed by movement in the direction of arrow D in FIG. 1A thus via the cover displacing fluid operated unit 12.

The charging container 5 more or less conforms in shape to the transport vessel 17. Thus with larger transport vessels, larger furnace charging containers 5 are used than is the case with smaller transport vessels 17.

After the charging container 5 has been rotated through 180° about its horizontal axis defined by the trunions 9, it is placed upon the seating ring 18 of the furnace and the cover 7 and the slider 13 are then retracted at right angles to one another in the manner described in connection with FIG. 5.

The contents of the container 5 thereupon fall into the furnace and a gate slider 13 can be closed. The charging unit can be returned to its original position for receiving another container. The furnace is meanwhile evacuated and its contents melted in the usual manner.

I claim:

1. A method of operating a furnace for the melting of radioactive metallic waste received in a metallic transport vessel having a cover, comprising the steps of:

(a) inserting said vessel into an upwardly open furnace charging container generally conforming in shape to said vessel and closing said container with a laterally retractable container cover;

(b) inverting said container through substantially 180° about a horizontal axis and positioning it upon a seating ring at a charging mouth of said furnace, said charging mouth being formed with a horizontally shiftable slider sealing said mouth of said furnace;

(c) laterally withdrawing said container cover and said slider which form a gate from said container which is thereby opened and through which said waste and said vessel are dumped into said furnace; and (d) evacuating said furnace and melting said vessel and the waste therein under suction.

2. The method defined in claim 1 wherein said transport vessel cover is at least loosened from said transport vessel after said transport vessel has been introduced into said container and before said container is closed by said laterally retractable container cover whereby said transport vessel cover is dumped into said furnace with said transport vessel and said waste.

3. The method defined in claim 1 wherein said transport vessel cover remains in place on said transport vessel after said container has been closed by said container cover, further comprising the step of piercing a bottom of said transport vessel with a pressure venting opening.

4. A radioactive metallic waste disposal apparatus comprising:

a transport vessel containing therein radioactive metallic waste, said vessel having a transport vessel cover;

a melting furnace having a mouth formed with a seating ring and provided with a horizontally shiftable slider sealing said mouth at said ring;

a furnace charging container which has an opening and generally conforms in shape to said vessel;

means for supporting said container to enable said container to swing from an upright position in which said opening can receive said transport vessel through 180° about a horizontal axis into an inverted position in which said container opens into said mouth of said furnace;

a laterally retractable container cover adapted to close said container upon the insertion of said transport vessel therein, said container cover being retractable when said container is positioned inverted over said mouth of said furnace to enable the discharge of said transport vessel and radioactive waste contained therein into said furnace; and means for retracting said container cover and said slider independently of one another to communicate the interior of said container with the interior of said furnace through said mouth.

5. The apparatus defined in claim 4 wherein said retractable container cover and said slider are guided for retracting displacement at a right angle to one another.

6. The apparatus defined in claim 4 further comprising means on a bottom of said container for perforating the bottom of said vessel to provide a pressure venting opening therein.

7. A method of charging a furnace for the melting of radioactive metallic waste received in a metallic transport vessel having a transport-vessel cover and wherein the furnace is provided with a mouth closed by a horizontally shiftable slider, said method comprising the steps of:

(a) inserting said vessel into an upwardly open furnace charging container generally conforming in shape to said vessel and closing said container with a laterally retractable container cover;

(b) inverting said container through substantially 180° about a horizontal axis and disposing said container on said furnace whereby said container cover is disposed above said slider; and (c) laterally withdrawing said container cover and said slider to communicate said furnace with said container whereby said container forms a gate through which said vessel and said radioactive waste are discharged into said furnace for melting therein.

8. The method defined in claim 7 wherein said transport vessel cover is loosened onto transport vessel before said container cover is closed.

9. The method defined in claim 7 wherein said transport vessel cover is removed from said transport vessel before said container cover is closed.

10. The method defined in claim 7 wherein said transport vessel cover remains sealingly on said transport vessel after said container cover is closed, said method further comprising the step of piercing the bottom of said transport vessel to form a vent opening therein of a cross section sufficient to vent pressure from said vessel as said vessel and said waste is melted in said furnace.

* * * * *